June 20, 1950  G. P. BUNN  2,511,901
AGGLOMERATION OF CARBON BLACK
Filed Oct. 15, 1945
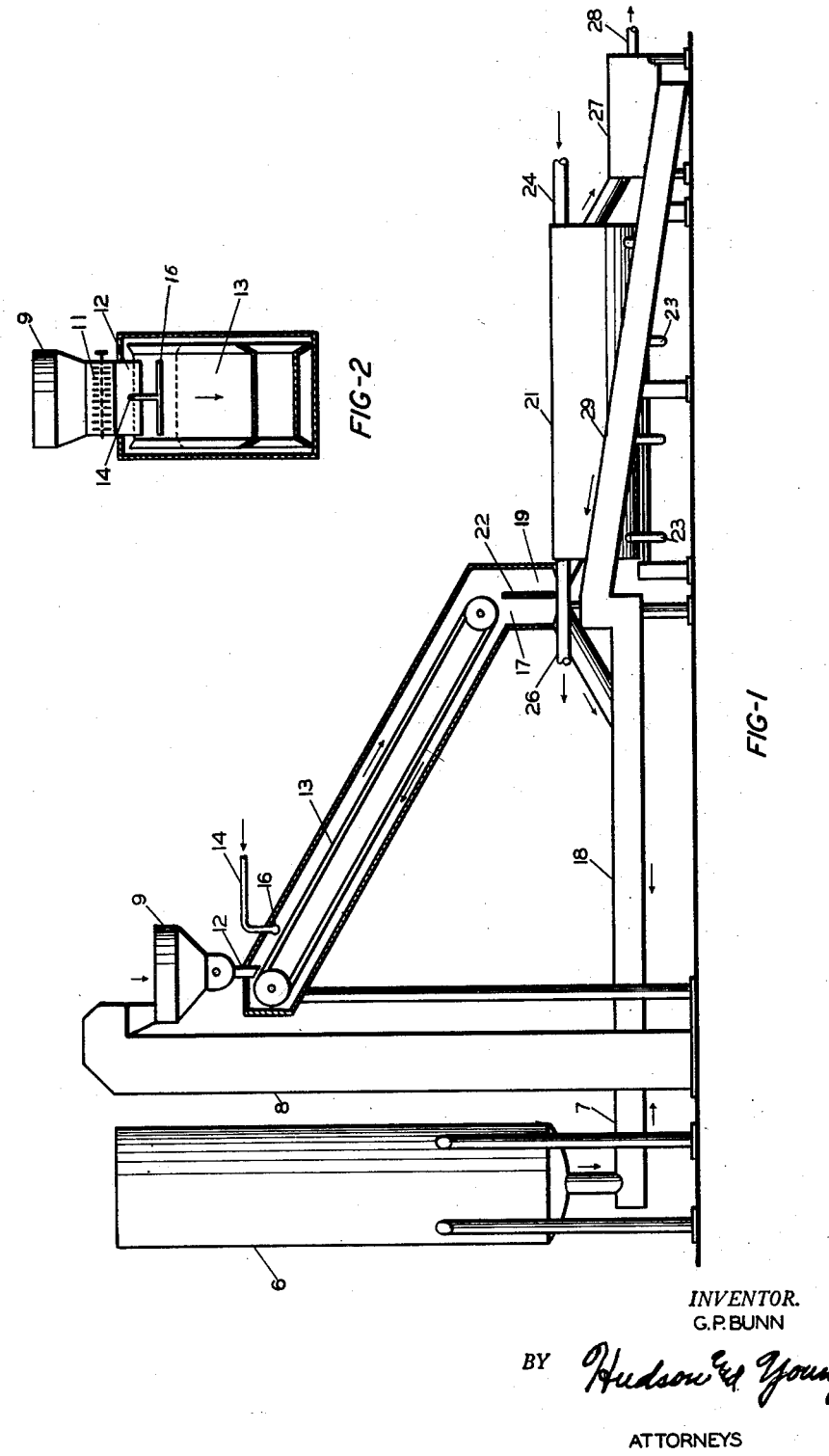
INVENTOR.
G. P. BUNN
BY Hudson & Young
ATTORNEYS Patented June 20, 1950

2,511,901

UNITED STATES PATENT OFFICE 2,511,901

AGGLOMERATION OF CARBON BLACK

George P. Bunn, Bartlesville, Okla., assignor to Phillips Petroleum Company, a corporation of Delaware Application October 15, 1945, Serial No. 622,467

7 Claims. (Cl. 18—48)

This invention relates to a process for the agglomeration of finely divided flocculent powders. The process of this invention is particularly applicable to the agglomeration of carbon black. In one of its more specific aspects the present invention relates to the agglomeration of carbon black with latex to form pellets.

Carbon black is produced by the thermal decomposition of hydrocarbons. Many processes are known and used in its production. These produce a wide variety of types and grades of this particular form of carbon. Two types of processes are widely used for the production of most carbon black. One is the so-called "channel" process in which hydrocarbon gas is burned in luminous flames which impinge on cool steel beams or "channels." The finely divided particles of carbon, similar in appearance to soot, are scraped from the channels and, after compacting into a more dense form, packaged for shipment. Rotating plates are sometimes employed in place of channels as collecting surfaces for the carbon. The other process which is rather widely used is the so-called "furnace" process in which a hydrocarbon gas or oil is decomposed by heating to a temperature at which free carbon is liberated in a finely divided amorphous state. The flocculent carbon so produced is collected, compacted, and packaged for shipment. Other processes are used for the production of special blacks for particular uses.

Carbon black is used as a pigment and as a compounding ingredient in the manufacture of rubber. The major proportion of the carbon black produced is used in the manufacture of rubber goods. Carbon black imparts desirable abrasion resistance to rubber goods and is widely used for this purpose, almost exclusively, in the manufacture of tires for vehicles. In the compounding of rubber with carbon black, the black must be highly dispersed in the rubber. Conventionally, the dispersion is accomplished by mixing the rubber with carbon black by kneading in a Banbury or by milling on rolls. Carbon black in powdered form liberates a large quantity of dust in these mixing operations. This dust is an annoyance and a hazard to workmen and, in addition, a contaminant to white or colored rubber goods which may be processed in the same building. To reduce the dust problem in handling and using carbon black, it is now customary to form the raw carbon black into small pellets or briquettes which have a higher bulk density than the carbon black as initially produced and which are substantially dustless in character. Commercial pellets vary in size from about one thirty-second to about three-eighths inch in diameter.

In the compounding of natural rubber, carbon black produced by the channel process is generally preferred; with synthetic rubber, on the other hand, carbon black produced by the furnace process is preferred. The present process may be employed for pelleting either of these widely used carbon black products. It is particularly valuable for the pelleting of furnace black since this black is preferred with synthetic rubber and synthetic rubber latex is readily available.

Throughout this specification, the term "pelleting" is used in its broadest sense to designate the agglomeration of powdered material into larger particles, regardless of the process by which the agglomeration is effected or the nature of the particle produced. The term "pellet" is used to designate the agglomerate particle.

The term "rubber" is used in its broadest sense and includes vulcanizable natural hydrocarbon gums and polymers or copolymers of polymerizable organic compounds; the former are referred to as natural rubbers while the latter are referred to as synthetic rubbers. The term "synthetic rubber" used in this specification is in accordance with the use of this term in the art and includes the polymerization products of olefins, diolefins, styrene and its derivatives, alkyl esters of acrylic and alkacrylic acid (e. g., methyl acrylate and methyl methacrylate), and other organic compounds having at least one active vinyl group ($CH_2$—$C<$). These compounds are polymerized alone or in admixture with one another to produce various synthetic rubbers.

Carbon black, as initially produced is a finely divided flocculent powder having an apparent bulk density of about 3 pounds per cubic foot. It may be densified by mechanical agitation to give a powder having a bulk density of about 12 pounds per cubic foot. The densifying operation apparently reduces the quantity of air or other gases associated with the carbon black without appreciable agglomeration of the carbon black particles. The density may be further increased by mechanical agitation of the dry carbon black or by imparting a rolling motion to the carbon black particles. This operation forms agglomerates or pellets of carbon black resulting in particles ranging in size from about 8 mesh to about 100 mesh. Particles larger or smaller in size may be formed, but in general the foregoing range represents the desirable limits. Preferably the carbon black particles so formed are about 10 mesh in size, or within the range of about 8 mesh to about 40 mesh. Dry pelleting of carbon black has proven very satisfactory for channel blacks, but is less useful for pelleting of soft blacks, or furnace blacks.

Carbon black may be pelleted by any of the so-called wet pelleting processes. There are two methods of wet pelleting in general use. In one, the raw carbon black is admixed with sufficient water to form a paste, extruded through dies and broken into columnar segments. The other method involves wetting of a portion of the raw carbon black, preferably with a fine spray, while subjecting the carbon black to mechanical agitation which agglomerates the carbon black. Pellets formed by either of these methods are subjected to a drying operation to remove the water therefrom prior to packaging and shipping.

Another method of increasing the bulk density of carbon black prior to shipping is used to some extent, particularly for soft blacks or furnace blacks. By this method the carbon black is first predensified as described hereinbefore to a bulk density of about 12 pounds per cubic foot and the predensified carbon black is then compressed into a cake having a bulk density of about 25 pounds per cubic foot. Often the predensified black is put in shipping containers, paper bags, for example, prior to the compressing operation. Prior to use, the cake of carbon black must be disintegrated. The bagging, compressing, and disintegrating operations cause large amounts of carbon black dust to be liberated, making these operations disagreeable for the operators.

The present invention provides a process for the pelleting of finely powdered materials to form pellets of substantially uniform size, of dustless character, and having the quality of being readily dispersed in rubber. The present process is particularly applicable to the pelleting of carbon black and is especially useful for pelleting soft black or furnace black. It is to be understood, however, that the present invention is not limited to the pelleting of carbon black, but that it may be used for pelleting or other fine powders, particularly those used in the compounding of natural or synthetic rubber. In accordance with this invention, carbon black is pelleted with latex as a wetting agent. Either natural or synthetic latex may be used, synthetic latex, however, is preferred. The product has high mechanical strength, resisting crushing under normal shipping conditions, yet is readily broken down and dispersed by milling. The term latex as used herein includes natural latex and synthetic latex, i. e., polymers of polymerizable organic compounds in aqueous emulsions, and is used also to include aqueous dispersions of rubber, and aqueous dispersions of unpolymerized polymerizable organic compounds.

In accordance with this invention, the flocculent carbon black to be pelleted is contacted with natural or synthetic latex in an amount sufficient to wet a portion of the carbon black. The carbon black wet with the latex is subjected to cascading, i. e., to a rolling action, e. g., to the action of gravity on an inclined surface, to form pellets more or less spherical in form. Various mechanical elements may be employed to form pellets in accordance with the process of the present invention. Specific embodiments of apparatus suitable for carrying out the process are disclosed in detail hereinafter.

An object of this invention is to provide a process for pelleting flocculent powdered material. Another object is to provide a process for treating carbon black to produce small agglomerate particles or pellets. Another object is to provide a process for pelleting a flocculent powdered material using latex as a binder. Still another object is to provide apparatus for pelleting carbon black and similar flocculent powdered material. Other objects and advantages will be apparent to those skilled in the art from the accompanying drawings and the following detailed disclosure.

Fig. 1 is a diagrammatic elevational view, partly in cross-section, of a preferred embodiment of apparatus forming a part of my invention.

Fig. 2 is an end view of a portion of the apparatus of Fig. 1.

In accordance with one embodiment of this invention dustless carbon black pellets are produced by forming an inclined surface of flocculent carbon black and contacting the flocculent carbon black on the inclined surface with droplets of latex. Each droplet of latex wets a small quantity of flocculent carbon black and rolls or tumbles over the surface of flocculent carbon black. The rolling action of the droplet of latex and incorporated carbon black forms pellets of carbon black admixed with latex. The size of the pellets so produced may be controlled by regulation of the size of the latex droplets. Subsequent drying of the pellets results in a pelleted product of substantially uniform size comprising carbon black in intimate admixture with rubber originally contained in the latex. These dried or partially dried pellets are firm, substantially dustless, and may be readily broken down and dispersed in rubber in compounding operations.

In a preferred specific embodiment of my invention, latex is dripped onto a thin bed of carbon black moving on a conveyor so sloped as to permit the balls or pellets of carbon black and rubber so formed to roll along into a suitable collection system. The acid reaction of the carbon black upon the latex coagulates the rubber and causes the carbon black and rubber to be aggregated into pellets or capsules. Preferably, the conveyor is of the belt type and moves in the direction of travel of the pellets. The slope of the conveyor is preferably such that the latex-wetted carbon black will roll under the influence of gravity down the incline over the surface of flocculent carbon black on the inclined conveyor. The slope of the conveyor should not be so great that the flocculent carbon black slides along the surface of the conveyor. Since the specific physical properties of carbon black depend to a large extent upon the process and conditions employed in its manufacture, and latex is variable in its physical properties, depending upon its nature and concentration, the optimum slope of the inclined surface is best determined by experiment. For one high modulus furnace black, the optimum slope of the inclined surface is about 40° from the horizontal. The present invention is particularly advantageous for pelleting furnace blacks similar to that manufactured by Phillips Petroleum Company and sold under the trade name "Philblack" since these blacks do not lend themselves readily to pelleting by conventional processes.

The amount of latex used to effect pelleting in the apparatus is variable, it being essential that an amount sufficient to wet only a portion of the carbon black be used so that a surface of dry flocculent black is available for the pellets to roll along. This rolling over flocculent carbon black serves to shape the pellets and to absorb excess moisture by accretion of carbon black on the surface of the agglomerate or granule of wetted carbon black so that the resulting pellet is not soft and tacky. The wet pellets as produced by this method are not tacky or adhesive because of the coating of relatively dry carbon black on the surface of the pellets. These pellets are preferably subjected to additional rolling, tumbling, or cascading (these terms being synonymous), in the presence of flocculent carbon black.

It is preferable, but not necessary, to dry the pellets with a hot gas, e. g., flue gases and the like, to reduce the moisture content of the pellets to a low value before packaging and shipping. This drying operation may be carried out simultaneously with the secondary rolling or tumbling operation. These operations may be carried out in a hollow rotating drum of the type more or less conventionally used in the production of carbon black pellets.

With reference to the accompanying drawing, flocculent carbon black as originally produced is stored in a storage tank 6. The flocculent carbon black is transferred from the storage tank via conveyor 7 and elevator 8 to an elevated supply bin 9 as feed to the pelleting apparatus. The supply bin is provided with an agitator and distributor 11 which insures uniform flow and distribution of the black to the pelleting zone through a discharge spout 12. The spout 12 discharges the flocculent black onto an inclined moving conveyor belt 13. The conveyor belt is preferably moved in the direction, as indicated on the drawing, required to carry the black down the incline. The belt 13 may be roughened to minimize slippage of flocculent carbon black along the surface of the belt. Commercial rubber belting is very satisfactory for this service. A thin bed of flocculent carbon black is spread on the conveyor belt from the supply bin 9. Latex from a supply pipe 14 is dripped onto the bed of flocculent carbon black from a distributor 16. Distributor 16 may be perforated or provided with suitable spray nozzles. Each droplet of latex upon contact with the flocculent carbon black wets only a small portion of the black, and the wetted black then rolls or tumbles along the surface of flocculent black on the conveyor belt. These aggregates of carbon black wetted with latex move down the incline faster than the conveyor belt and the bed of flocculent carbon black carried thereon, and form pellets of carbon black wetted with latex. At the bottom of the incline, the wet pellets and flocculent carbon black are discharged from the belt. The greater percentage of the unwetted flocculent carbon black drops into hopper 17 from which it is returned by conveyor 18 to the elevator 8 for recycle to the pelleting apparatus. The wet pellets, which have a higher velocity and greater density than the unwetted black, are discharged from the belt into hopper 19, together with some of the flocculent carbon black, from which they are passed into drum 21. The hoppers 17 and 19 are separated by a barrier 22 which may be made adjustable to effect any desired degree of separation between the flocculent carbon black and the wet pellets. Preferably some flocculent carbon black is discharged into hopper 19 and passed to drum 21.

Drum 21 is an elongated hollow cylindrical container arranged to rotate about its longitudinal axis. The drum is supported on and rotated by wheels 23 in conventional manner as is well known in the art. In the drum the wet pellets are subjected to a rolling or cascading action due to the rotation of the drum. The cascading action serves to further form or shape the pellets. Flocculent carbon black in the drum prevents agglomeration or sticking together of the pellets during the shaping operation. Hot gas or air for drying is supplied to the drum through pipe 24 and discharged through pipe 26. Flocculent carbon black dispersed in the drying gas may be removed from the stream leaving the drum via pipe 26 by suitable recovery apparatus, e. g., a cyclone separator, not shown in the drawing. The finished pellets are discharged from drum 21 to a sizing apparatus 27, suitably a conventional screen, wherein the pellets are separated from flocculent unpelleted carbon black. The finished carbon black pellets are discharged through outlet 28 and are ready for packaging and shipping. Flocculent carbon black separated from the finished pellets by the sizing apparatus is transferred by a conveyor 29 to the conveyor 18 and recycled to the pelleting apparatus.

For successful pelleting of carbon black in the apparatus of my invention it is essential that the drops of latex wet the flocculent carbon black upon contact. While synthetic latexes produced by some processes may inherently have wetting properties such that they will wet flocculent carbon black upon contact, it is generally necessary to add a wetting agent to the latex. The latex produced in the GR-S process, for example, does not wet flocculent carbon black upon contact and it is necessary to add a wetting agent to the latex prior to pelleting carbon black in accordance with the process of my invention. Many wetting agents are known in the art; the particular wetting agent employed is a matter of preference. The quantity of wetting agent required for a given latex and carbon black may be readily determined by experiment. The wetting agent used should be one which is compatible with the rubber into which the carbon black pellets are to be later incorporated. As a wetting agent, an ester of a sulfonated dicarboxylic acid or a sodium salt of an alkyl naphthalene sulfonic acid may be used.

Carbon black was pelleted in accordance with the process of this invention using GR-S latex prepared by the standard procedure. The standard recipe is as follows:

| Components: | Parts by weight |
| --- | --- |
| Butadiene-1,3 | 75 |
| Styrene | 25 |
| Water | 180 |
| Soap | 5 |
| Catalyst (potassium persulfate) | 0.3 |
| Modifier (dodecyl mercaptan) | 0.5 |

An oil in water type emulsion is formed by agitation of the components in a closed reactor. Polymerization is carried out for a period of about 12 hours at 50° C. At the end of the polymerization period phenyl beta naphthylamine is added to stop the polymerization reaction. After removal of unreacted monomers from the emulsion, latex is obtained which is suitable for use in pelleting in accordance with my invention. This is the GR-S latex. The carbon black used was a high modulus furnace black. An inclined surface of carbon black was formed and dilute GR-S latex was dripped onto the carbon black. The optimum slope of the carbon black bed was determined experimentally by means of a variable inclined plane. An angle of approximately 40° from the horizontal was found to be best suited for this particular carbon black. At said 40° angle, the flocculent carbon black was effectively retained on the inclined surface and wetted agglomerate particles of carbon black rolled down the inclined surface. Dilute latex containing approximately 15 per cent rubber and 5 per cent wetting agent by weight formed satisfactory pellets when dripped on the sloping surface of carbon black. With this particular latex and carbon black, best results were obtained using from 5 to 6 per cent wetting agent by weight (on the basis of pure wetting agent). The concentration of the latex may be varied over rather wide limits. The rubber content of the finished pellet may be varied by varying the concentration of the latex used. Pellets containing more than about 10 per cent rubber by weight on a dry basis are rubbery in character. In general, from 8 to 10 per cent rubber by weight in the dry pellet is preferred.

The foregoing specific examples are given by way of illustration only. It will be obvious to one skilled in the art that various modifications may be employed without departing from the spirit of this invention.

I claim:

1. A continuous process for pelleting carbon black which comprises contacting small globules of latex with dry flocculent carbon black on an extended inclined moving surface of dry flocculent carbon black to produce agglomerates of latex and carbon black, said inclined moving surface making an angle of approximately 40° with the horizontal and moving in a generally downward direction at said angle, adding further dry flocculent carbon black to the surface of said agglomerates by rolling said agglomerates down said inclined surface in the direction of movement of said inclined surface, separating agglomerates from unagglomerated carbon black, recycling the unagglomerated carbon black into the first mentioned dry flocculent carbon black, drying the separated agglomerates to a desired moisture content and removing dried agglomerates as the product of the process.

2. A process for pelleting carbon black which comprises contacting small globules of latex with dry flocculent carbon black on an extended inclined moving surface of dry flocculent carbon black to produce agglomerates of latex and carbon black, said inclined moving surface moving in a generally downward direction, adding dry flocculent carbon black to the surface of said agglomerates by rolling said agglomerates down said inclined surface in the direction of movement of said inclined surface, separating agglomerates from unagglomerated carbon black, drying the separated agglomerates to a desired moisture content and removing dried agglomerates as the product of the process.

3. A process for pelleting carbon black which comprises contacting small globules of latex with dry flocculent carbon black on an extended inclined moving surface of dry flocculent carbon black to produce agglomerates of latex and carbon black, said inclined moving surface moving in a generally downward direction, rolling said agglomerates down said inclined surface, separating agglomerates from unagglomerated carbon black, drying the separated agglomerates to a desired moisture content and removing dried agglomerates as the product of the process.

4. A process for pelleting carbon black which comprises contacting small globules of latex with dry flocculent carbon black on an extended inclined surface of dry flocculent carbon black to produce agglomerates of latex and carbon black and rolling said agglomerates down said extended inclined surface of dry flocculent carbon black to add a surface layer of dry carbon black to said agglomerates.

5. The process of claim 4 wherein the rolling of said agglomerates down said extended inclined surface is by gravity.

6. A process for pelleting carbon black which comprises contacting small globules of latex with dry flocculent carbon black on an extended inclined surface of dry flocculent carbon black to produce agglomerates of latex and carbon black, rolling said agglomerates down said extended inclined surface of dry flocculent carbon black to add a surface layer of dry carbon black to said agglomerates and moving said inclined surface in the general direction of movement of said downward rolling agglomerates.

7. The process of claim 6 wherein the rolling of said agglomerates down said extended inclined moving surface is by gravity.

GEORGE P. BUNN.

REFERENCES CITED

The following references are of record in the file of this patent:

UNITED STATES PATENTS

| Number | Name | Date |
|---|---|---|
| 295,298 | Smith | Mar. 18, 1884 |
| 1,239,221 | Rodman | Sept. 4, 1917 |
| 1,558,688 | Loomis | Oct. 27, 1925 |
| 1,846,518 | Hibline | Feb. 23, 1932 |
| 1,863,834 | Coolidge et al. | June 21, 1932 |
| 1,876,630 | Derming | Sept. 13, 1932 |
| 1,980,130 | Fasting | Nov. 6, 1934 |
| 2,071,846 | Lamb et al. | Feb. 23, 1937 |
| 2,185,158 | Price | Dec. 26, 1939 |

FOREIGN PATENTS

| Number | Country | Date |
|---|---|---|
| 270,658 | Great Britain | Apr. 12, 1928 |